(12) United States Patent
Sakamoto et al.

(10) Patent No.: US 10,585,235 B2
(45) Date of Patent: Mar. 10, 2020

(54) OPTICAL CONNECTOR

(71) Applicant: NIPPON TELEGRAPH AND TELEPHONE CORPORATION, Tokyo (JP)

(72) Inventors: Taiji Sakamoto, Tsukuba (JP); Takashi Matsui, Tsukuba (JP); Kazuhide Nakajima, Tsukuba (JP); Kotaro Saitoh, Tsukuba (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/313,724

(22) PCT Filed: Jun. 21, 2017

(86) PCT No.: PCT/JP2017/022828
§ 371 (c)(1),
(2) Date: Dec. 27, 2018

(87) PCT Pub. No.: WO2018/008399
PCT Pub. Date: Jan. 11, 2018

(65) Prior Publication Data
US 2019/0170931 A1 Jun. 6, 2019

(30) Foreign Application Priority Data
Jul. 4, 2016 (JP) ................. 2016-132511

(51) Int. Cl.
*G02B 6/38* (2006.01)
*G02B 6/02* (2006.01)

(52) U.S. Cl.
CPC ....... *G02B 6/02042* (2013.01); *G02B 6/3831* (2013.01); *G02B 6/3834* (2013.01); *G02B 6/3885* (2013.01)

(58) Field of Classification Search
CPC .. G02B 6/3831; G02B 6/3834; G02B 6/3835; G02B 6/3885
See application file for complete search history.

(56) References Cited

U.S. PATENT DOCUMENTS

2014/0219609 A1 8/2014 Nielson et al.
2016/0274314 A1 9/2016 Sasaki et al.
2017/0168247 A1* 6/2017 Watanabe ............ G02B 6/3834

FOREIGN PATENT DOCUMENTS

EP 1172673 A2 1/2002
JP 2002-098860 A 4/2002
(Continued)

OTHER PUBLICATIONS

R. Nagase, K. Sakaime, K. Watanabe, and T. Saito, "MU-Type Multicore Fiber Connector", Trans. IEICE, vol. E96-C, No. 9, pp. 1173-1177, (2013).
(Continued)

*Primary Examiner* — Sung H Pak
*Assistant Examiner* — Hoang Q Tran
(74) *Attorney, Agent, or Firm* — Harness, Dickey & Pierce, P.L.C.

(57) ABSTRACT

An optical connector is provided which includes at least one multi-core block fixing and holding a plurality of multi-core optical fibers in a state where a position in a direction orthogonal to an optical axis of each multi-core optical fiber and a rotation angle around the optical axis are in a predetermined state, and a ferrule including an accommodating portion accommodating the multi-core block.

7 Claims, 11 Drawing Sheets

(56) References Cited

FOREIGN PATENT DOCUMENTS

| JP | 2015-079145 A | 4/2015 |
| JP | 2016-504620 A | 2/2016 |
| WO | WO-2014/089159 A2 | 6/2014 |
| WO | WO-2015093520 A1 | 6/2015 |
| WO | WO-2016/031678 A1 | 3/2016 |

OTHER PUBLICATIONS

K. Watanabe, T. Saito, K. Kawasaki, M. Iwaya, T. Ando, K. Suematsu, M.Shiino,"Development of MPO type 8-multicore fiber connector", in Proc. OFC2015, W4B.3,(2015).

Watanabe, K. et al., MPO Type 8-Multicore Fiber Connector With Physical Contact Connection, Journal of Lightwave Technology, Jan. 15, 2016,vol. 34, No. 2, pp. 351-357.

Watanabe, K. et al., MT Type connector for 2×6 multicore fibers, 2016 IEEE Photonics Society Summer Topical Meeting Series (SUM), Aug. 25, 2016, pp. 228-229.

International Search Report for PCT/JP2017/022828, ISA/JP, dated Sep. 19, 2017, with English translation attached.

Extended European Search Report regarding EP178240065, dated Jan. 10, 2020.

\* cited by examiner

OPTICAL CONNECTOR

CROSS-REFERNCE TO RELATED APPLICATIONS

This application is a 371 U.S. National Stage of International Application No. PCT/JP2017/022828, filed on Jun. 21, 2017, which claims priority on Japanese Patent Application No. 2016-132511, filed in Japan on Jul. 4, 2016. The contents of both of the above applications are incorporated herein by reference.

TECHNICAL FIELD

The present invention relates to an optical connector connecting a multi-core optical fiber.

BACKGROUND ART

When multi-core optical fibers are connected by optical connectors, it is necessary to align the cores of the optical fibers. For alignment, there are a method of adjusting a position in the horizontal and vertical directions in the cross-section of the optical fiber and a method of adjusting a rotation angle where a center axis corresponds to the longitudinal direction of the optical fiber (see, for example, Non-Patent Document 1).

In a multi-fiber optical connector that connects a plurality of multi-core optical fibers collectively, a method using individual blocks has been proposed as a method of adjusting a rotation angle of a plurality of multi-core optical fibers. In such a method, a plurality of multi-core optical fibers are accommodated in individual blocks, respectively, and the rotation angle is aligned. The plurality of aligned individual blocks are arranged side by side and are accommodated in an accommodating portion in a ferrule (for example, see Patent Document 2).

PRIOR ART DOCUMENTS

Patent Documents

[Non-Patent Document 1] R. Nagase, K. Sakaime, K. Watanabe, and T. Saito, "MU-Type Multi-core Fiber Connector", Trans. IEICE, Vol. E96-C, No. 9, pp. 1173-1177, (2013).

[Non-Patent Document 2] K. Watanabe, T. Saito, K. Kawasaki, M. Iwaya, T. Ando, K. Suematsu, M. Shiino, "Development of MPO type 8-multi-core fiber connector", in Proc. OFC2015, W4B.3, (2015).

DISCLOSURE OF INVENTION

Problems to be Solved by the Invention

However, according to the method described in Non-Patent Document 2, since each of the plurality of individual blocks has clearance, as the number of the multi-core optical fibers increases, the clearance of the individual block is integrated. As a result, a large axis deviation may be caused. As the axis misalignment, there are axial misalignment in the rotation direction of the optical fiber due to clearance and axial misalignment of the vertical and horizontal directions with respect to a cross-section of the optical fiber.

The present invention has been made in view of the above circumstances, an optical connector in which clearance between blocks fixing and holding each of the multi-core optical fibers is reduced to enable highly accurate alignment when accommodating a plurality of multi-core optical fibers is provided.

SUMMARY OF THE INVENTION

A first aspect of the present invention is an optical connector including: at least one multi-core block fixing and holding a plurality of multi-core optical fibers in a state where a position in a direction orthogonal to an optical axis of each multi-core optical fiber and a rotation angle around the optical axis are in a predetermined state; and a ferrule including an accommodating portion accommodating the multi-core block.

A second aspect of the present invention is the optical connector according to the first aspect, and it is preferable that the multi-core block has a rectangular cross-sectional shape having a clearance with respect to a design value, the accommodating portion of the ferrule has a rectangular cross-sectional shape; and when an allowable value of a rotation angle of rotation of the multi-core block in an optical axis direction in the accommodating portion of the ferrule is determined, the larger the clearance is, the smaller a number of the multi-core blocks to be accommodated in the accommodating portion of the ferrule is, and the smaller the allowable value of the rotation angle is, the smaller the number of the multi-core blocks to be accommodated in the accommodating portion of the ferrule is.

A third aspect of the present invention is the optical connector according to the second aspect, and it is preferable that the cross-sectional shape of the multi-core block is an a×b rectangle having a clearance of Δa and Δb with respect to a design value, the cross-sectional shape of the accommodating portion of the ferrule is an x×y rectangle; and the number m×n of the multi-core blocks to be accommodated in the accommodating portion of the ferrule is determined so that the allowable rotation angle of the multi-core block in the accommodating portion of the ferrule satisfies both the following formulas (1) and (2).

(Formula 1)

$$\sin^{-1}\left(\frac{a+m\Delta a}{\sqrt{a^2+b^2}}\right) - \sin^{-1}\left(\frac{a}{\sqrt{a^2+b^2}}\right) \leq \text{Allowable rotation angle} \quad (1)$$

$$\sin^{-1}\left(\frac{a}{\sqrt{a^2+b^2}}\right) - \cos^{-1}\left(\frac{b+n\Delta b}{\sqrt{a^2+b^2}}\right) \leq \text{Allowable rotation angle} \quad (2)$$

A fourth aspect of the present invention is the optical connector according to the third aspect, and it is preferable that in the number m×n of the multi-core blocks accommodated in the accommodating portion of the ferrule, n=1 and m≤5.

A fifth aspect of the present invention is the optical connector according to the third aspect, and it is preferable that in the number m×n of the multi-core blocks accommodated in the accommodating portion of the ferrule, n=2 and m≤5.

A sixth aspect of the present invention is the optical connector according to the third aspect, where the multi-core block preferably rotates with a clearance within a range of a maximum of m·Δa/2 and n·Δb/2 in the accommodating portion of the ferrule.

A seventh aspect of the present invention is the optical connector according to the first aspect, where each of the multi-core optical fibers includes a plurality of cores and a cladding surrounding the plurality of cores, and in the plurality of cores, it is preferable that each of a distance between a core center and a center of the cladding is equal to each other, and has allowable rotation angle deviation determined based on the distance.

An eighth aspect of the present invention is the optical connector according to the first aspect, and it is preferable that where each of the multi-core optical fibers includes a plurality of cores and a cladding surrounding the plurality of cores, in the plurality of cores, a distance between at least one core center and a center of the cladding is different from a distance between the other remaining core centers and the center of the cladding, and has allowable rotation angle deviation which is determined based on a maximum distance.

EFFECTS OF THE INVENTION

According to the above aspects of the present invention, the multi-core block in which the plurality of multi-core optical fibers are collectively fixed and held is accommodated in the accommodating portion in the ferrule. Therefore, compared with the case where a plurality of multi-core optical fibers are fixed and held individually by blocks, and these blocks are arranged side by side and are accommodated in a ferrule, the clearance between the blocks can be reduced and highly accurate positioning can be performed.

In addition, the smaller the allowable rotation angle of the multi-core block in the accommodating portion of the ferrule is, the smaller the number of multi-core blocks to be accommodated is set, and the larger the above-described clearance is, the smaller the number of multi-core blocks to be accommodated is set. In this manner, the accommodation number of the multi-core block can be set to an optimum number according to the size of the accommodating portion of the ferrule, the size of the multi-core block, and the allowable rotation angle. As a result, the connection loss due to the rotation angle deviation of the multi-core block can be greatly reduced.

That is, according to the above-described aspects of the present invention, an optical connector in which a clearance between blocks fixing and holding each of the multi-core optical fibers is reduced to enable highly accurate alignment when accommodating a plurality of multi-core optical fibers can be provided.

DESCRIPTION OF THE PREFERRED EMBODIMENTS

Figure 1:
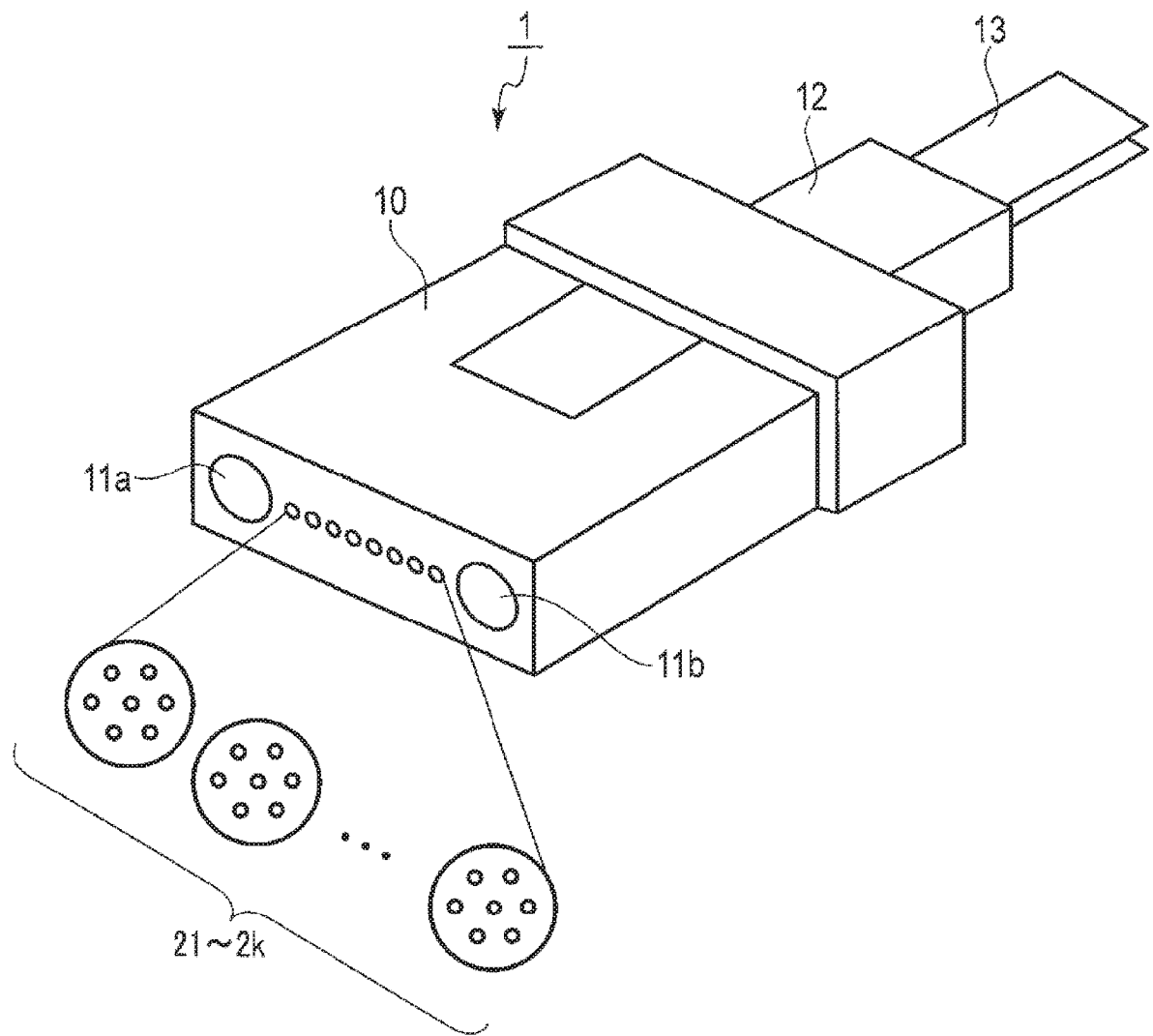
FIG. 1 is a perspective view showing an external appearance of an optical connector according to an embodiment of the present invention.

Hereinafter, embodiments of the present invention will be described with reference to the drawings.
First Embodiment FIG. 1 is a perspective view showing an external appearance of an optical connector according to one embodiment of the present invention. The optical connector 1 is composed of a Mechanically Transferable (MT) type optical connector, and includes an MT ferrule 10, a ribbon fiber 13, and a boot 12 protecting the ribbon fiber 13 at an end portion of the MT ferrule 10. Reference numerals 11a and 11b denote guide pin holes, and guide pins (not shown) of the optical connector to be connected at the time of the optical connector connection are inserted when the optical connector is connected.

Inside the MT ferrule 10, there is provided an accommodating portion of a cavity having a rectangular transverse cross-sectional shape, and at least one multi-core block is accommodated in the accommodating portion. Several examples relating to multi-core blocks will be described below.

FIRST EXAMPLE

Figure 2:
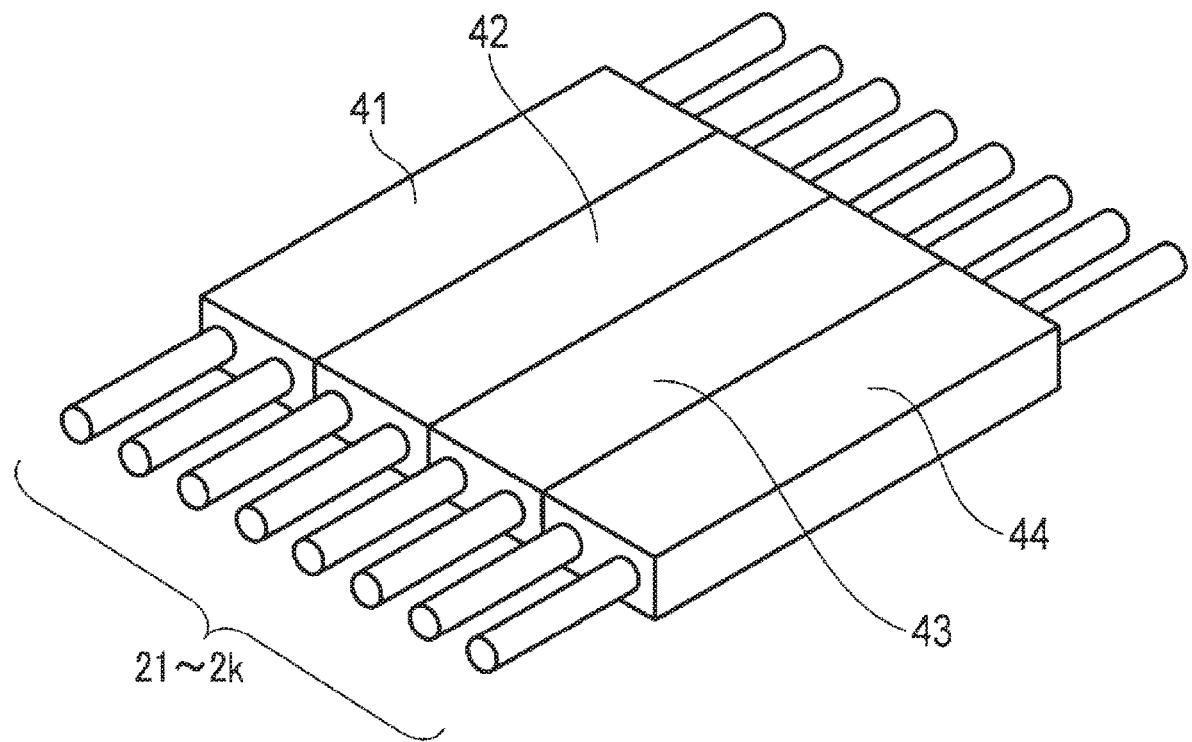
FIG. 2 is a perspective view showing a first example of multi-core blocks accommodated in the optical connector shown in FIG. 1.
Figure 3:
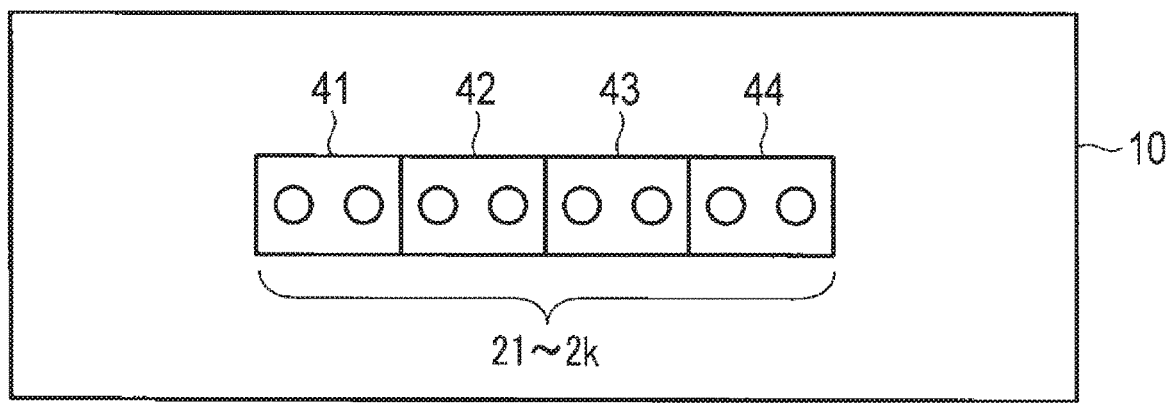
FIG. 3 is a transverse cross-sectional view showing a state in which the multi-core blocks shown in FIG. 2 is accommodated in the optical connector shown in FIG. 1.

FIG. 2 is a perspective view showing a first example of multi-core blocks, and FIG. 3 is a view showing a state where the multi-core blocks are accommodated in the MT ferrule 10.

In the first example, four multi-core blocks 41 to 44 which are rectangular shape are used. Each of the multi-core blocks 41 to 44 has two insertion holes, and the multi-core optical fibers 21 to 2k (k=8 in this embodiment) are inserted into these insertion holes. In this case, the formation position of the insertion hole in the multi-core blocks 41 to 44 defines the accuracy in a two-dimensional direction orthogonal to the optical axis of the multi-core optical fibers 21 to 2k (k=8). In addition, the rotation angle around the optical axis of the multi-core optical fibers 21 to 2k (k=8) is aligned so as to be at the same predetermined angle with respect to the upper side of the multi-core blocks 41 to 44.

As shown in FIG. 3, the multi-core blocks 41 to 44 are accommodated in the accommodating portion of the MT ferrule 10 in a state where they are aligned in a row in the lateral direction (horizontal direction) in the drawing. At this time, the multi-core blocks 41 to 44 are disposed in close contact with each other and so that no gap is formed between the inner walls of the accommodating portion of the MT ferrule 10.

With such a configuration, in an optical connector that collectively accommodates the eight multi-core optical fibers 21 to 2k (k=8), the multi-core optical fibers 21 to 2k (k=8) are fixed and held in a pair with the four multi-core blocks 41 to 44. Therefore, alignment accuracy of the multi-core optical fibers 21 to 2k (k=8) is an integrated value of the clearance of the four multi-core blocks 41 to 44. As a result, as compared with the case where each one of the multi-core optical fibers 21 to 2k (k=8) is accommodated in a block and eight blocks in total are accommodated in the MT ferrule, the clearance between the blocks is reduced to a half, and it is possible to improve the alignment accuracy of the multi-core optical fibers 21 to 2k (k=8).

SECOND EXAMPLE

Figure 4:
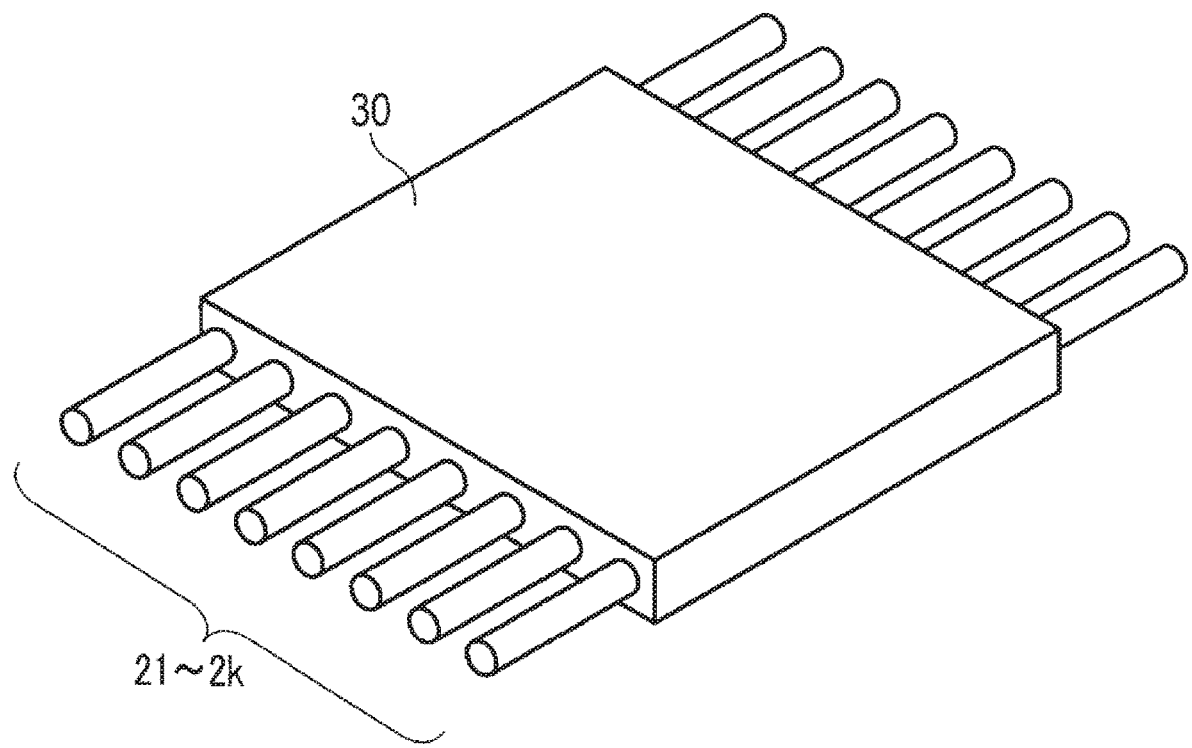
FIG. 4 is a perspective view showing a second example of multi-core blocks accommodated in the optical connector shown in FIG. 1.
Figure 5:
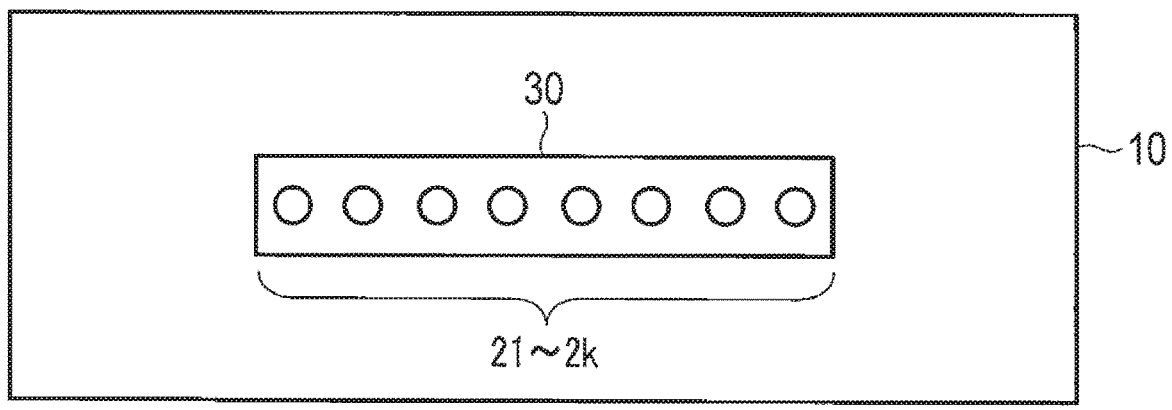
FIG. 5 is a transverse cross-sectional view showing a state in which the multi-core blocks shown in FIG. 4 is accommodated in the optical connector shown in FIG. 1.

FIG. 4 is a perspective view showing a second example of multi-core blocks, and FIG. 5 is a view showing a state where the multi-core blocks are accommodated in the MT ferrule 10.

In the multi-core block of the second example, eight insertion holes are provided in a row in one flat plate-like multi-core block 30, eight multi-core optical fibers 21 to 2k (k=8) are inserted in the insertion hole, and the rotation angles of the respective axes are aligned. The eight insertion holes define positional accuracy in a two-dimensional direction orthogonal to the optical axis of the multi-core optical fibers 21 to 2k (k=8). As shown in FIG. 5, the multi-core block 30 is accommodated in a state where the upper and lower surfaces and the respective side surfaces are in contact with the inner wall surface of the accommodating portion provided in the MT ferrule 10.

With such a configuration, in an optical connector that collectively accommodates eight multi-core optical fibers 21 to 2k (k=8), eight multi-core optical fibers 21 to 2k (k=8) is fixed and held in one block 30. Therefore, the alignment accuracy of the multi-core optical fibers 21 to 2k (k=8) is determined by the clearance of only one multi-core block 30. As a result, as compared with a case where each one of the multi-core optical fibers 21 to 2k (k=8) is accommodated in a block and eight blocks in total are accommodated in the MT ferrule 10, the clearance between the blocks is reduced to one-eighth to further improve the alignment accuracy of the multi-core optical fibers 21 to 2k (k=8).

THIRD EXAMPLE

In a third Example, a total of thirty-two multi-core optical fibers 21 to 2k (k=32) are distributedly arranged in a plurality of multi-core blocks and are fixed and held in a state where the respective plurality of multi-core blocks are arranged in a row in each multi-core block, and these multi-core blocks are accommodated in the MT ferrule 10 in a stacked state.

Figure 6A:
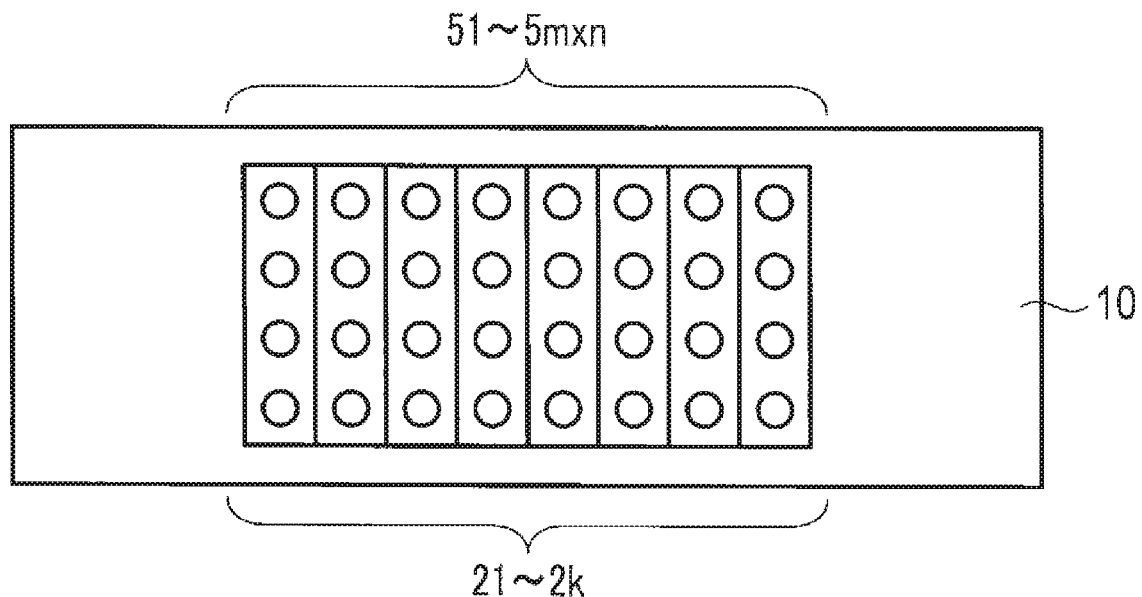
FIG. 6A is a transverse cross-sectional view showing a state in which multi-core blocks according to a third example of the present invention is accommodated in an optical connector.

FIG. 6A shows a first configuration example of the present Example. In the first configuration example, eight multi-core blocks each having a flat plate shape with four insertion holes formed in a row are prepared, and in these multi-core blocks 51 to 5m×n (m=8, n=1), four of the thirty-two multi-core optical fibers 21 to 2k (k=32) in total are inserted into the insertion hole of the optical fiber 21 to 2k (k=32) and are fixed and held. The four insertion holes in each of the multi-core blocks 51 to 5m×n (m=8, n=1) define the positional accuracy in the two-dimensional direction orthogonal to the optical axis of the multi-core optical fibers 21 to 2k (k=32). The multi-core blocks 51 to 5m×n (m=8, n=1) are accommodated in the accommodating portion of the MT ferrule 10 in a state of being aligned in the lateral direction as shown in FIG. 6A.

With such a configuration, in an optical connector that collectively accommodates thirty-two multi-core optical fibers 21 to 2k (k=32), four of the thirty-two multi-core optical fibers 21 to 2k (k=32) are distributed, fixed and held in eight multi-core blocks 51 to 5m×n (m=8, n=1), and the eight multi-core blocks 51 to 5m×n (m=8, n=1) are accommodated in the MT ferrule 10 in a state of being aligned in a row.

For this reason, the alignment accuracy of the multi-core optical fibers 21 to 2k (k=32) is determined by the integrated value of the clearance of eight multi-core blocks 51 to 5m (m=8) in the lateral direction, and is determined by the individual clearance of the multi-core blocks 51 to 5n (n=1) in the vertical direction. As a result, compared with the case where the multi-core optical fibers 21 to 2k (k=32) are accommodated one by one in a block and a total of thirty-two blocks is accommodated in the accommodating portion of the MT ferrule 10, the clearance between the blocks is greatly reduced, thereby making it possible to improve the alignment accuracy of the multi-core optical fibers 21 to 2k (k=32).

Figure 6B:
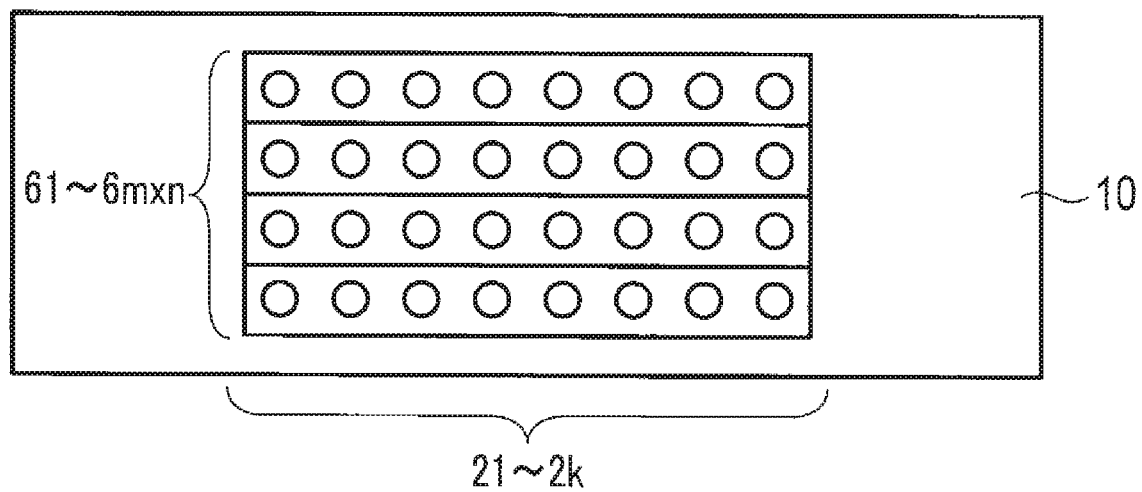
FIG. 6B is a transverse cross-sectional view showing a state in which multi-core blocks according to a third example of the present invention is accommodated in an optical connector.

FIG. 6B shows a second configuration example of the present Example. In the second configuration example, as shown in FIGS. 4 and 5, four multi-core blocks each having a flat plate with eight insertion holes are formed in a row are prepared, and in these multi-core blocks 61 to 6n (n=4), a total of thirty-two multi-core optical fibers 21 to 2k (k=32) are fixed and held in the respective insertion holes. The eight insertion holes in each of the multi-core blocks 61 to 6n (n=4) define the positional accuracy in the two-dimensional direction orthogonal to the optical axis of the multi-core optical fibers 21 to 2k (k=32). As shown in FIG. 6B, the multi-core blocks 61 to 6m×n (m=1, n=4) described above are accommodated in the accommodating portion of the MT ferrule 10 in a state of being stacked in four layers in the vertical direction.

With such a configuration, in an optical connector that collectively accommodates thirty-two multi-core optical fibers 21 to 2k (k=32), eight of the thirty-two multi-core optical fibers 21 to 2k (k=32) are distributed in four multi-core blocks 61 to 6m×n (m=1, n=4), and are fixed and held in a state of being arranged in a row in the lateral direction. The four multi-core blocks 61 to 6m×n (m=1, n=4) are accommodated in the MT ferrule 10 in a state of being stacked in four layers in the vertical direction.

Therefore, the alignment accuracy of the multi-core optical fibers 21 to 2k (k=32) is determined by the integrated value of the clearance of the four multi-core blocks 61 to 6n (n=4) in the vertical direction, and is determined by the individual clearance of the multi-core blocks 61 to 6m (m=1) in the lateral direction. As a result, as compared with the case where each one of the multi-core optical fibers 21 to 2k (k=32) is accommodated in a block and thirty-two blocks in total are accommodated in the MT ferrule, the clearance between the blocks can be greatly reduced to improve the alignment accuracy of the multi-core optical fibers 21 to 2k (k=32).

FOURTH EXAMPLE

In a fourth Example, a total of thirty-two multi-core optical fibers 21 to 2k (k=32) are distributed in a plurality of multi-core blocks and are fixed and held in a state where the respective plurality of multi-core blocks are arranged in a matrix, and the multi-core blocks are arranged side by side and are accommodated in the MT ferrule 10. In addition, the multi-core optical fibers 21 to 2k (k=32) are fixed and held in a state of being arranged collectively in a matrix in one multi-core block.

Figure 7A:
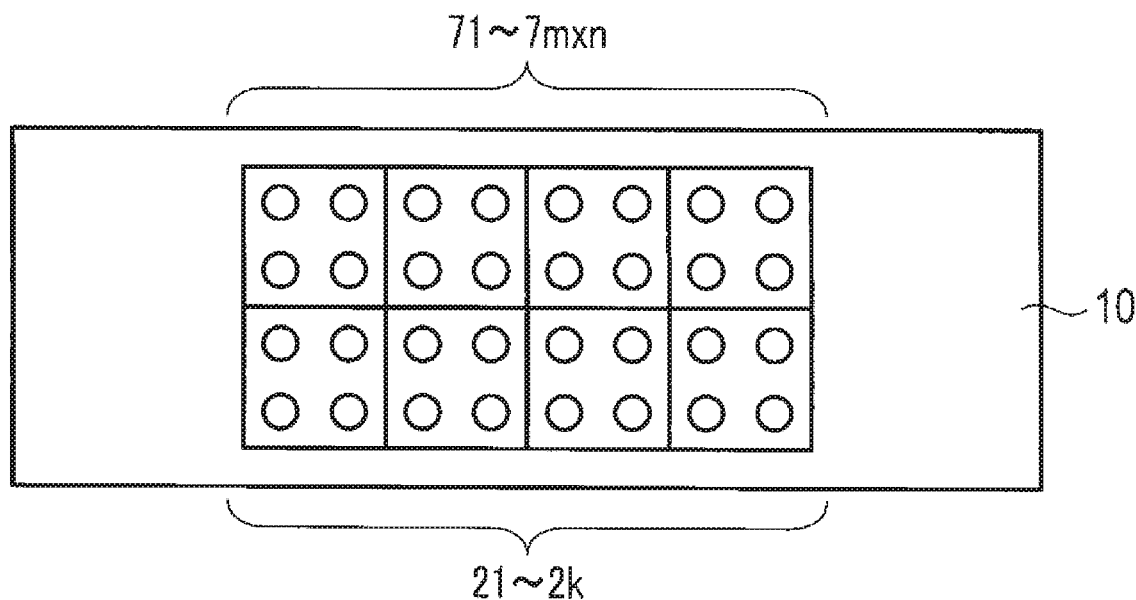
FIG. 7A is a transverse cross-sectional view showing a state in which multi-core blocks according to a fourth example of the present invention is accommodated in an optical connector.

FIG. 7A shows a first configuration example of the present embodiment. In the first configuration example, eight multi-core blocks, which are quadrangular prisms in which four insertion holes are formed in a 2×2 matrix, are prepared, and in the insertion hole of each of these multi-core blocks 71 to 7m×n (m=4, N=2), four of the thirty-two multi-core optical fibers 21 to 2k (k=32) are distributed, and are fixed and held in a state of being arranged in a matrix.

The four insertion holes in each of the multi-core blocks 71 to 7m×n (m=4, n=2) are positioned in the two-dimensional direction orthogonal to the optical axis of the multi-core optical fibers 21 to 2k (k=32). As shown in FIG. 7A, four multi-core blocks 71 to 7m×n (m=4, n=2) are arranged side by side in the lateral direction and in two layers in the vertical direction, and is accommodated in the accommodating portion of the MT ferrule 10 in a state where the side surface is in contact with the inner wall surface of the accommodating portion of the MT ferrule 10.

With such a configuration, in an optical connector that collectively accommodates thirty-two multi-core optical fibers 21 to 2k (k=32), four of the thirty-two multi-core optical fibers 21 to 2k (k=32) are distributed in eight multi-core blocks 71 to 7m×n (m=4, n=2), and are fixed and held in a state of being arranged in a matrix. In addition, as shown in FIG. 7A, the eight multi-core blocks 71 to 7m×n (m=4, n=2) are arranged in the MT ferrule 10 in a state where four of the multi-core blocks are arranged in the lateral direction and two of the multi-core blocks are arranged in the vertical direction.

Therefore, the alignment accuracy of the multi-core optical fibers 21 to 2k (k=32) is determined by the integrated value of clearance of the four multi-core blocks 71 to 7m (m=4) in the lateral direction, and is determined by the integrated value of clearance of the two multi-core blocks 71 to 7n (n=2) in the vertical direction. As a result, as compared with the case where each one of the multi-core optical fibers 21 to 2k (k=32) is accommodated in a block and thirty-two blocks in total are accommodated in the MT ferrule, the clearance between the blocks can be greatly reduced to improve the alignment accuracy of the multi-core optical fibers 21 to 2k (k=32).

Figure 7B:
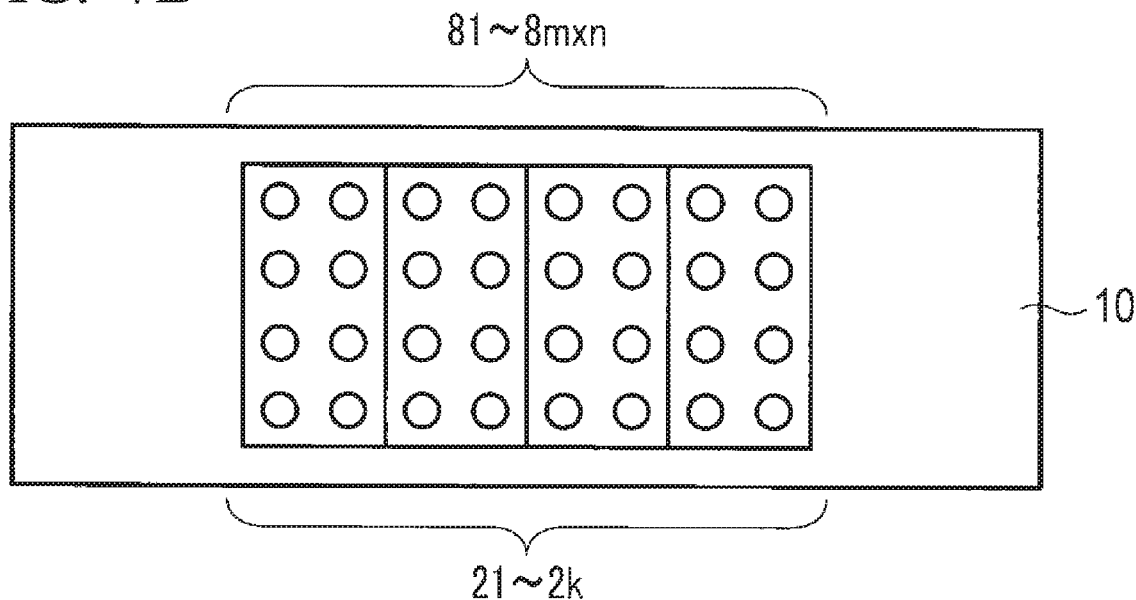
FIG. 7B is a transverse cross-sectional view showing a state in which multi-core blocks according to a fourth example of the present invention is accommodated in an optical connector.

FIG. 7B shows a second configuration example. In the second configuration example, four multi-core blocks, which are quadrangular prisms in which eight insertion holes are formed in a matrix of 2×4, are prepared, and in the insertion hole of each of these multi-core blocks 81 to 8m×n (m=4, n=1), a total of thirty-two multi-core optical fibers 21 to 2k (k=32) are distributed, and are fixed and held in a state of being arranged in a matrix.

The eight insertion holes in each of the, multi-core blocks 81 to 8m×n (m=4, n=1) are positioned in the two-dimensional direction orthogonal to the optical axis of the multi-core optical fibers 21 to 2k (k=32). As shown in FIG. 7B, four side-by-side blocks 81 to 8m×n (m=4, n=1) are arranged in the lateral direction so that the upper and lower surfaces and the respective side surfaces are positioned within the accommodating portion of the MT ferrule 10, and are accommodated in the accommodating portion of the MT ferrule 10 in a state of being in contact with the wall surface.

With such a configuration, in an optical connector that collectively accommodates thirty-two multi-core optical fibers 21 to 2k (k=32), eight of the thirty-two multi-core optical fibers 21 to 2k (k=32) are distributed in four multi-core blocks 81 to 8m×n (m=4, n=1), and are fixed and held in a state of being arranged in a matrix. The four multi-core blocks 81 to 8m×n (m=4, n=1) are accommodated in the MT ferrule 10 in a state of being arranged in the lateral direction.

For this reason, the alignment accuracy of the multi-core optical fibers 21 to 2k (k=32) is determined by the integrated value of the clearance of the four multi-core blocks 81 to 8m (m=4) in the lateral direction, and is determined only by the clearance of the individual multi-core blocks 81 to 8n (n=1) in the vertical direction. As a result, as compared with the case where one of the multi-core optical fibers 21 to 2k (k=32) is accommodated in each block and thirty-two blocks in total are accommodated in the MT ferrule, the clearance between the blocks can be reduced and it is possible to improve the alignment accuracy of the multi-core optical fibers 21 to 2k (k=32).

Figure 7C:
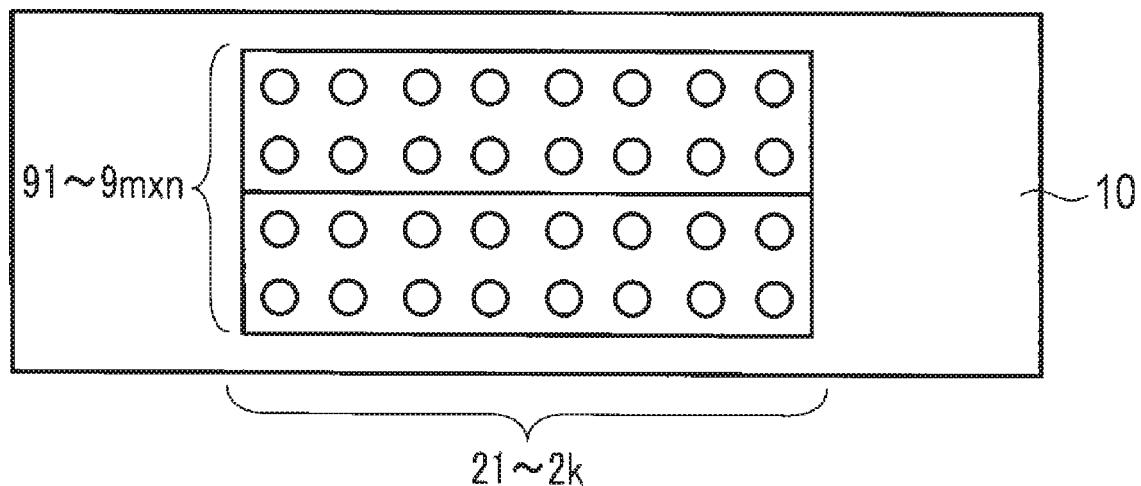
FIG. 7C is a transverse cross-sectional view showing a state in which multi-core blocks according to a fourth example of the present invention is accommodated in an optical connector.

FIG. 7C shows a third configuration example. In the third configuration example, two multi-core blocks, which are quadrangular prisms in which sixteen insertion holes are formed in a matrix of 2×8 are prepared, and in each of the insertion holes of these multi-core blocks 91 to 9m×n (m=1, n=2), a total of thirty-two multi-core optical fibers 21 to 2k (k=32) are distributed, and are fixed and held in a state of being arranged in a matrix of 2×8 in total.

The sixteen insertion holes in each of the multi-core blocks 91 to 9m×n (m=1, n=2) have positional accuracy in the two-dimensional direction orthogonal to the optical axis of the multi-core optical fibers 21 to 2k (k=32). As shown in FIG. 7C, in a state where the multi-core blocks 91 to 9m×n (m=1, n=2) are stacked in two layers in the vertical direction, upper and lower surfaces and side surfaces of the accommodating portion of the MT ferrule 10 and is accommodated in the accommodating portion of the MT ferrule 10 in a state of being in contact with the inner wall surface.

With such a configuration, in an optical connector that collectively accommodates thirty-two multi-core optical fibers 21 to 2k (k=32), sixteen of the thirty-two multi-core optical fibers 21 to 2k (k=32) are distributed in two multi-core blocks 91 to 9m×n (m=1, n=2), and are fixed and held in a state of being arranged in a 2×8 matrix. The two multi-core blocks 91 to 9m×n (m=1, n=2) are stacked in two layers in the vertical direction and accommodated in the MT ferrule 10.

Therefore, the alignment accuracy of the multi-core optical fibers 21 to 2k (k=32) is determined by the integrated value of the clearance of the two multi-core blocks 91 to 9n (n=2) in the vertical direction, and in the longitudinal direction, it is determined only by the individual clearance of the multi-core blocks 91 to 9m (m=1). As a result, as compared with the case where each one of the multi-core optical fibers 21 to 2k (k=32) is accommodated in a block and thirty-two blocks in total are accommodated in the MT ferrule, the clearance between the blocks can be reduced to improve the alignment accuracy of the multi-core optical fibers 21 to 2k (k=32).

Figure 7D:
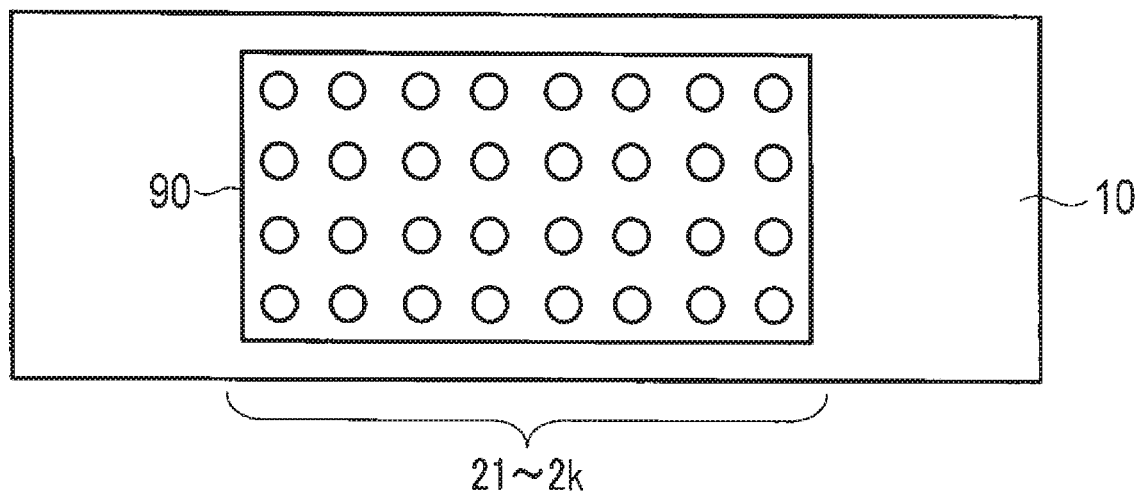
FIG. 7D is a transverse cross-sectional view showing a state in which multi-core blocks according to a fourth example of the present invention is accommodated in an optical connector.

FIG. 7D shows a fourth configuration example. In the fourth configuration example, one multi-core block, which is a quadrangular prism having thirty-two insertion holes formed in a matrix of 8×4, is prepared, and in each insertion hole of the multi-core block 90, a total of thirty-two multi-core optical fibers 21 to 2k (k=32) is fixed and held in a state of being arranged in a matrix of 8×4. Thirty-two insertion holes in each of the multi-core block 90 define positional accuracy in a two-dimensional direction orthogonal to the optical axis of the multi-core optical fibers 21 to 2k (k=32). The multi-core block 90 is accommodated in a state where the upper and lower surfaces and the respective side surfaces are in contact with the inner wall surface of the accommodating portion of the MT ferrule 10 as shown in FIG. 7D.

With such a configuration, in an optical connector that collectively accommodates thirty-two multi-core optical fibers 21 to 2k (k=32), the thirty-two multi-core optical fibers 21 to 2k (k=32) are fixed and held in a state of being arranged in a 2×8 matrix on one multi-core block 90, and the multi-core block 90 is accommodated in the MT ferrule 10.

Therefore, the alignment accuracy of the multi-core optical fibers 21 to 2k (k=32) is determined only by the clearance of one multi-core block 90 in both the vertical direction and the longitudinal direction. As a result, as compared with the case where one of the multi-core optical fibers 21 to 2k (k=32) is accommodated in each block and thirty-two blocks in total are accommodated in the MT ferrule, the clearance between the blocks can be greatly reduced and to further improve the alignment accuracy of the multi-core optical fibers 21 to 2k (k=32).

The number (m×n) of the multi-core blocks accommodated in the MT ferrule 10 is set as follows. Hereinafter, descriptions will be made with reference to FIG. 8A to 8C and FIG. 9.

Figure 8A:
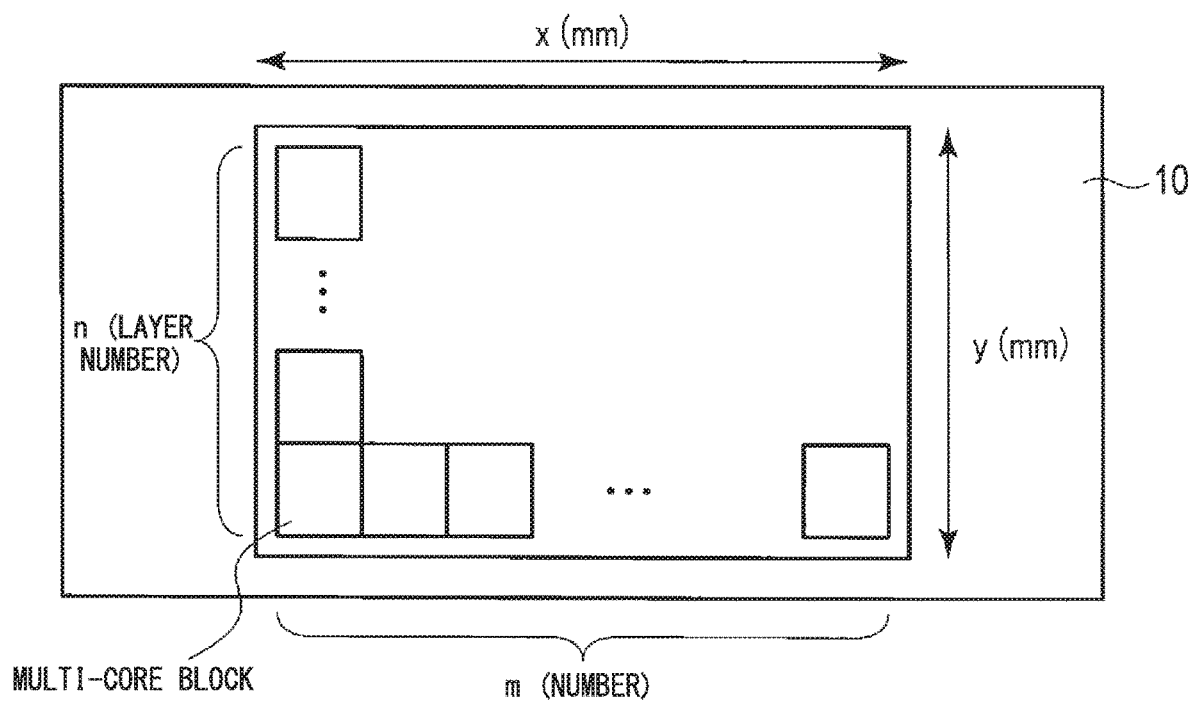
FIG. 8A is a diagram describing a relationship between clearance and a rotation angle of multi-core blocks.
Figure 8B:
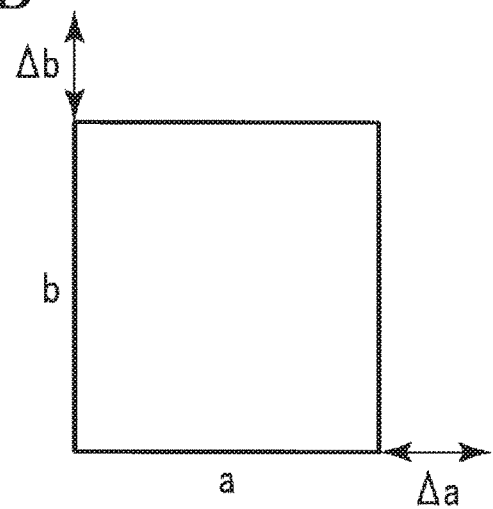
FIG. 8B is a diagram describing a relationship between clearance and a rotation angle of multi-core blocks.
Figure 8C:
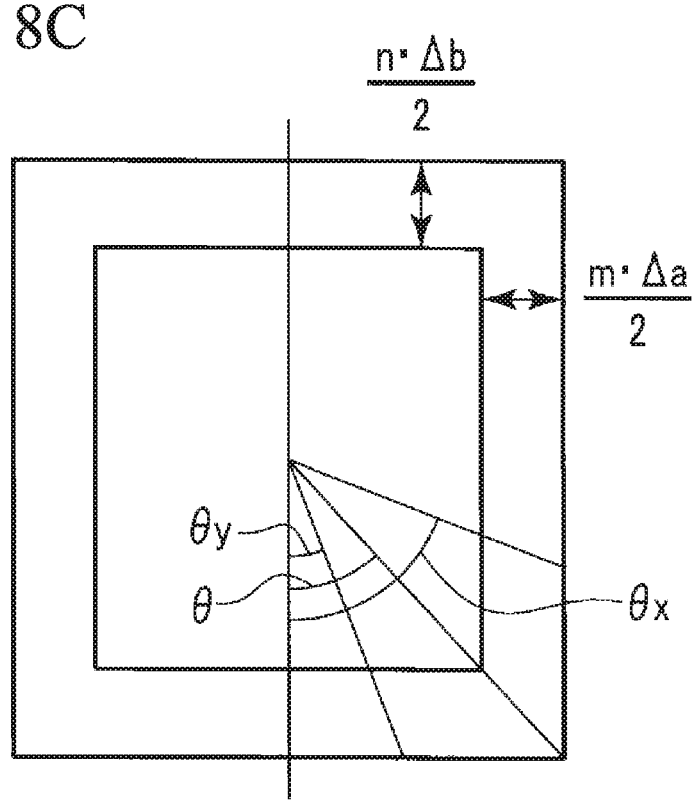
FIG. 8C is a diagram describing a relationship between clearance and a rotation angle of multi-core blocks.

That is, the size of the accommodating portion of the MT ferrule 10 is x×y (mm) as shown in FIG. 8A, and m×n multi-core blocks are accommodated in the accommodating portion of the MT ferrule 10. Furthermore, as shown in FIG. 8B, each multi-core block has clearance of Δa and Δb with respect to the design value a×b of the outer size of the multi-core block. Under the above conditions, the multi-core block rotates with the clearance within a range of a maximum of m·Δa/2 and n·Δb/2 in the accommodating portion of the MT ferrule 10 as shown in FIG. 8C.

The rotation angle is the smaller one of θx−θ or θ−θy, and the allowable angle of these rotation angles is expressed by the following formulas.

(Formula 2)

$$\theta x - \theta = \sin^{-1}\left(\frac{a + m\Delta a}{\sqrt{a^2 + b^2}}\right) - \sin^{-1}\left(\frac{a}{\sqrt{a^2 + b^2}}\right) \leq \text{Allowable rotation angle}$$

$$\theta - \theta y = \sin^{-1}\left(\frac{a}{\sqrt{a^2 + b^2}}\right) - \cos^{-1}\left(\frac{b + n\Delta b}{\sqrt{a^2 + b^2}}\right) \leq \text{Allowable rotation angle}$$

In order to satisfy this condition, the number (m×n) of multi-core blocks to be accommodated in the MT ferrule 10 is determined.

Figure 9:
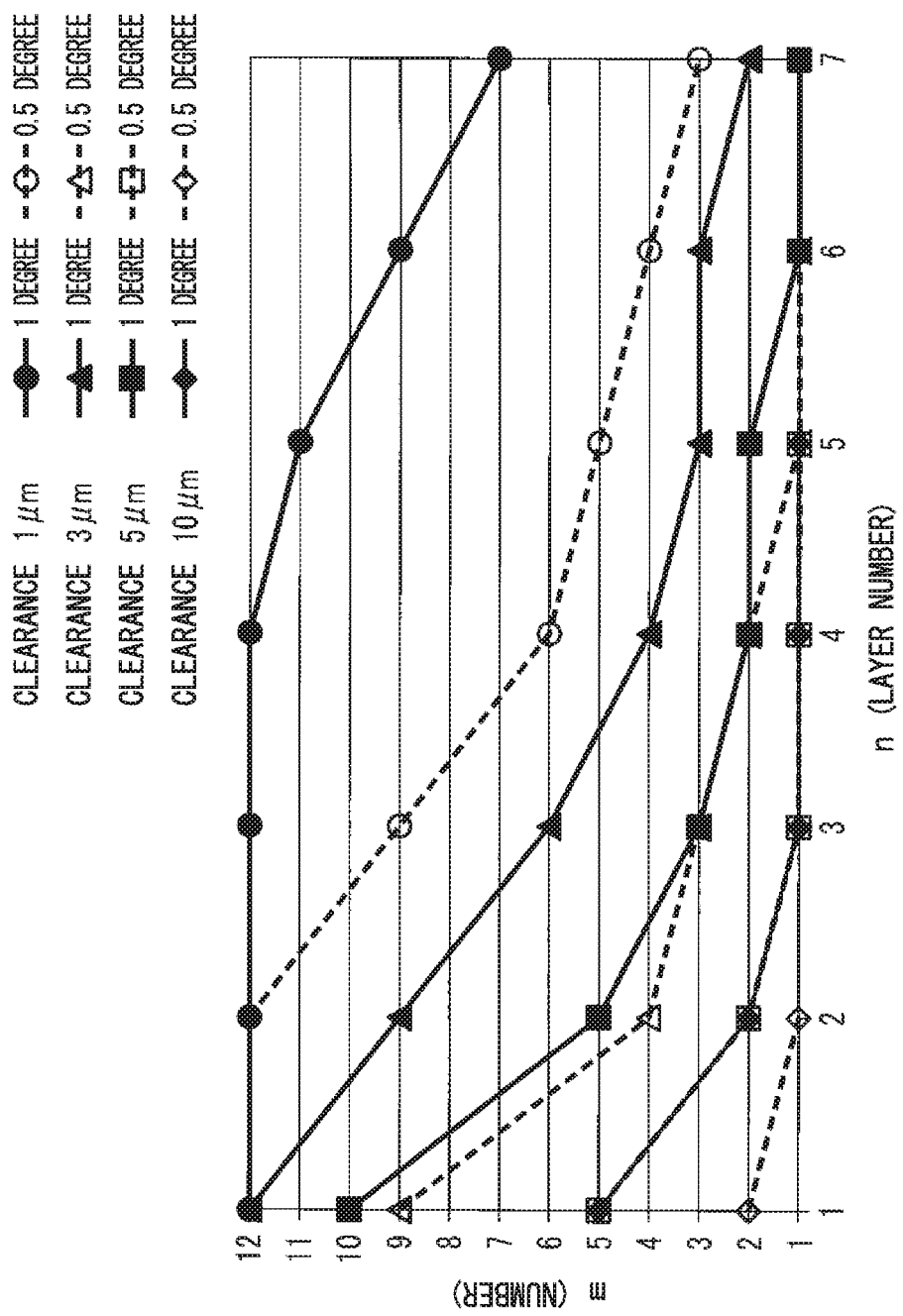
FIG. 9 is a graph showing an upper limit value of the number of multi-core blocks arranged in a two-dimensional direction, which is set according to the clearance and the rotation angle of multi-core blocks.

For example, when the size of the accommodating portion of the MT ferrule 10 accommodating the multi-core block is x=3.2 mm and y=1.8 mm, depending on the angle at which the multi-core block can rotate in the accommodating portion and the clearance of the multi-core block, the array number m in the lateral direction of the multi-core block and the lamination number n in the vertical direction in the accommodating portion must be a number equal to or less than the integer value of each line shown in FIG. 9. Also, when y=1.0 mm and y=0.5 mm, the same number or less is obtained.

In FIG. 9, the solid line and the broken line are the results when the allowable angle is 1 degree and 0.5 degrees respectively, and the marks of circle, triangle, square and rhombus are the results when clearance is respectively 1, 3, 5, and 10 μm. For example, when n=1 if the clearance is 5 μm, m is set to 5 or less in order to set the allowable rotation angle to 0.5 degrees or less. Also, even when n=2, m is set to 5 or less in order to set the allowable rotation angle equal to or less than 0.5 degrees. In addition, when n=1 and the clearance is 10 μm, m is set to 5 or less in order to set the allowable rotation angle 1 degree or less.

That is, as is clear from FIG. 9, the smaller the allowable rotation angle is, the smaller the numbers of m and n are. Also, the larger the clearance is, the smaller the numbers of m and n are. In particular, when n=1 and n=2, it is preferable to set m≤5.

One block is used for each of the eight multi-core optical fibers (MCF) described in Non-Patent Document 2, and eight blocks are placed in the MT ferrule with n=1 and m=8. When accommodated, in a block with clearance of 10 μm, rotation angle deviation is generated by up to 3 degrees at the maximum with respect to the opposing multi-core optical fiber to be connected. As a result, connection loss close to 1 dB may occur.

In contrast, for example, as shown in FIG. 4, eight multi-core optical fibers 21 to 2k (k=8) are fixed and held in a single multi-core block in a row, and when the multi-core block 30 is accommodated in the MT ferrule 10 as n=1 and m=1 as shown in FIG. 5, the rotation angle deviation can be reduced to about 0.4 degrees at the maximum. As a result, the connection loss can be improved to 0.05 dB or less. Even when n=2, the rotation angle deviation can be reduced to about 0.7 degree at the maximum, so that the connection loss can be improved to 0.1 dB or less That is, according to the size of the accommodating portion of the MT ferrule 10, the clearance of the multi-core block, and the allowable rotation angle of the multi-core block in the accommodating portion, the number m×n of the multi-core blocks in the accommodating portion is set to an appropriate value. The connection loss due to the rotation angle deviation of the multi-core block can be greatly reduced.

Figure 10A:
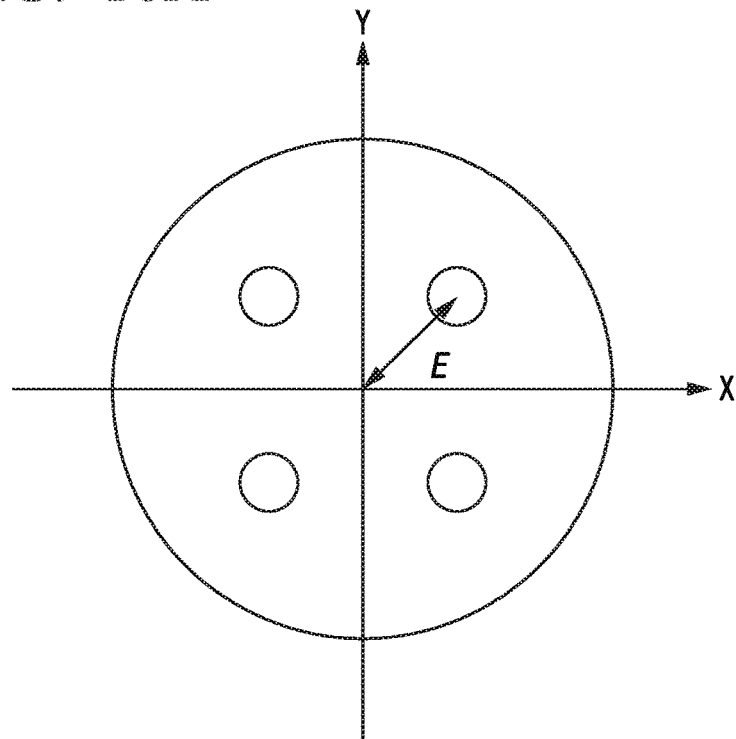
FIG. 10A is a view showing an example of axial misalignment of a core position due to a rotation angle deviation in a 4-core fiber.
Figure 10B:
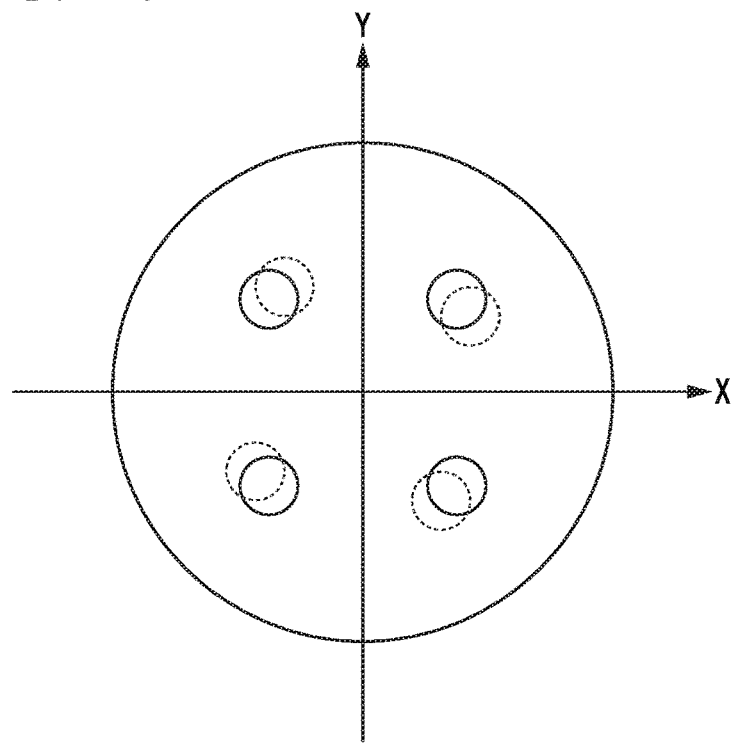
FIG. 10B is a view showing an example of axial misalignment of a core position due to a rotation angle deviation in a 4-core fiber.

Acceptable rotation angle deviation is determined by the allowable connection loss and the core arrangement structure of the multi-core fiber. FIGS. 10A and 10B show examples of axis misalignment of the core position at the connection point due to the rotation angle deviation using the 4-core fiber as an example. Assuming that the distance between the center of each core and the center of the cladding including these cores (the origin on the xy axis plane in the drawing) is E, the axial shift amount d between the cores at the connection point when the rotation angle deviation θ occurs (the core position is indicated by a dotted line in FIG. 10B), can be obtained from the cosine theorem of the trigonometric function as follows.

$$d^2 = E^2 - 2E^2 \cos(\theta) \quad \text{(Formula 3)}$$

Furthermore, the connection loss α (dB) is obtained from the mode field diameter MFD of the fiber by the following formula. Here, W=MFD/2.

(Formula 4)

$$\alpha = 10\log_{10}\left[\exp\left(-\frac{2d^2}{2W^2}\right)\right]$$

Figure 11:
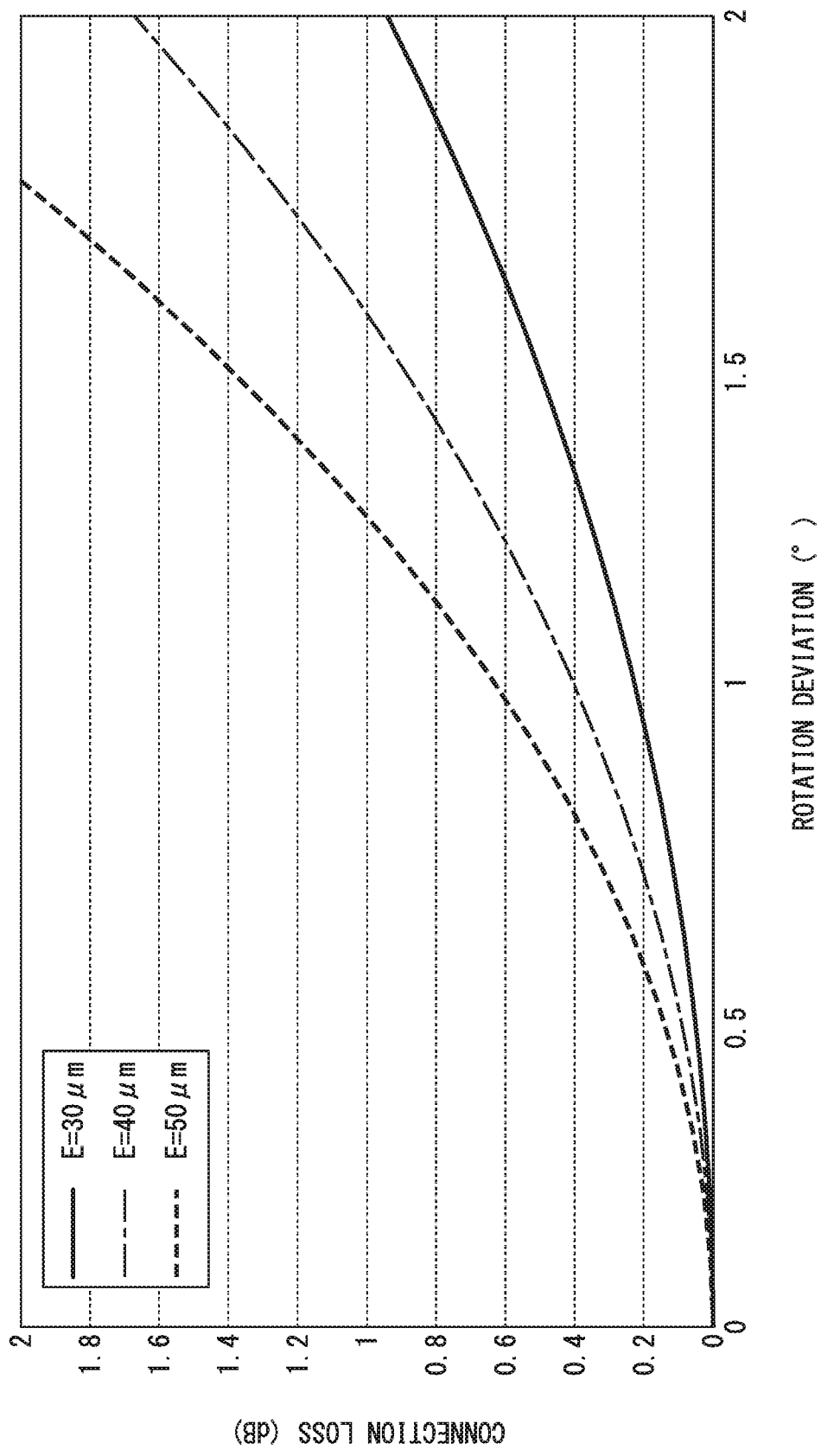
FIG. 11 is a graph showing a relationship between the rotation angle deviation and the connection loss with respect to the core.

FIG. 11 is a graph showing a relationship between the rotation angle deviation and the connection loss with respect to the core. Here, the calculation results of the connection loss with respect to the rotation angle deviation when the core is set to E=30, 40, and 50 μm are shown. As the MFD of the core, 9.0 μm is employed which is within the MFD range described in ITU-T global standard recommendation G.652 (single mode optical fiber).

As shown in FIG. 11, the connection loss characteristic with respect to the rotation deviation greatly changes with respect to the distance E from the cladding center of the core, and it can be seen that the connection loss increases as E increases. Furthermore, for example, when E=30 μm, if it is attempted to reduce the connection loss to 0.1 dB or less, it is found that the allowable rotation angle deviation is 0.7°. On the other hand, when E=50 μm, the deviation is 0.4°, and the allowable rotation angle for the core with large E becomes small.

Here, E is the same for all cores in the example of the 4-core fiber, but in general, E is not always the same in all cores. For multi-core fibers with different E in each core, the allowable rotation angle deviation is determined from the rotation angle deviation that is less than the allowable connection loss for the core with the largest E.

As described above in detail, according to one embodiment of the present invention, the plurality of multi-core optical fibers 21 to 2k are fixed and held in one multi-core block 30 and are accommodated in an accommodating portion in the MT ferrule 10. Alternatively, the plurality of the multi-core optical fibers 21 to 2k is divided into several fibers and are distributed in the multi-core blocks 41 to 44 respectively, and are fixed and held, the number of which is smaller than the number of the multi-core optical fibers 21 to 2k. The multi-core blocks 41 to 44 are arranged side by side and are accommodated in the accommodating portion of the MT ferrule 10.

Therefore, compared with the case where a plurality of multi-core optical fibers 21 to 2k are fixed and held individually by blocks, and the blocks are arranged side by side and are accommodated in the MT ferrule 10, the clearance between the blocks is reduced and highly accurate positioning can be performed.

In addition, the smaller the allowable rotation angle of the multi-core block in the accommodating portion of the MT ferrule 10 is, the smaller the number of multi-core blocks to be accommodated is set, and the larger the clearance above-described is, the smaller the number of multi-core blocks to be accommodated is set. In this manner, the accommodation number of the multi-core block can be set to an optimum number according to the size of the accommodating portion of the MT ferrule 10, the size of the multi-core block, and the allowable rotation angle. As a result, the connection loss due to the rotation angle deviation of the multi-core block can be greatly reduced.

Other Embodiments

In the above-described embodiment, a case where a flat plate-shaped or column-shaped resin block having a rectangular transverse cross-sectional shape is used as a multi-core block has been described as an example. However, the cross-sectional shape may be other shapes such as rhombus and trapezoid, and it is more preferable if the shape is such that the rotation of the block hardly occurs. Also, the material of the block is not limited to a resin.

In addition, regarding the arrangement number and arrangement pattern of multi-core optical fibers in multi-core blocks, the number of multi-core blocks to be accommodated in ferrules and the arrangement pattern thereof, the number of multi-core optical fibers accommodated in one optical connector, and the number of multi-core blocks and the like can also be implemented with various modifications without departing from the gist of the present invention.

The present invention is not limited to the above-described embodiments, but can be embodied by modifying constituent elements without departing from the gist thereof. In addition, a plurality of constituent elements disclosed in the above embodiment may be appropriately combined. For example, some constituent elements may be deleted from all the constituent elements shown in the embodiment. Furthermore, the constituent elements over different embodiments may be appropriately combined.

DESCRIPTION OF REFERENCE NUMERALS

1: optical connector
10: ferrule
11a, 11b: guide pinhole
12: boot
13: ribbon fiber
21 to 2k: multi-core optical fiber
30, 41 to 44, 51 to 5m×n, 61 to 6m×n, 71 to 7m×n, 81 to 8m×n, 90, 91 to 9m×n:
multi-core block

The invention claimed is:

1. An optical connector comprising: at least one multi-core block fixing and holding a plurality of multi-core optical fibers in a state where a position in a direction orthogonal to an optical axis of each multi-core optical fiber and a rotation angle around the optical axis are in a predetermined state: and a ferrule comprising an accommodating portion accommodating the multi-core block: wherein a cross-sectional shape of the multi-core block is an a×b rectangle having a clearance Δa and Δb with respect to a design value, the cross-sectional shape of the accommodating portion of the ferrule is an X×Y rectangle: and a number m×n of the multi-core blocks to be accommodated in the accommodating portion of the ferrule is determined so that an allowable rotation angle of the multi-core block in the accommodating portion of the ferrule satisfies both the following formulas (1) and (2)

(Formula 1)

$$\sin^{-1}\left(\frac{a + m\Delta a}{\sqrt{a^2 + b^2}}\right) - \sin^{-1}\left(\frac{a}{\sqrt{a^2 + b^2}}\right) \leq \text{Allowable rotation angle} \quad (1)$$

-continued $$\sin^{-1}\left(\frac{a}{\sqrt{a^2+b^2}}\right) - \cos^{-1}\left(\frac{b+n\Delta b}{\sqrt{a^2+b^2}}\right) \leq \text{Allowable rotation angle.} \quad (2)$$

2. The optical connector according to claim 1, wherein:
the multi-core block has a rectangular cross-sectional shape having a clearance with respect to a design value;
the accommodating portion of the ferrule has a rectangular cross-sectional shape; and
when an allowable value of a rotation angle of the multi-core block in an optical axis direction in the accommodating portion of the ferrule is determined, the larger the clearance is, the smaller a number of the multi-core blocks to be accommodated in the accommodating portion of the ferrule is, and the smaller the allowable value of the rotation angle is, the smaller the number of the multi-core blocks to be accommodated in the accommodating portion of the ferrule is.

3. The optical connector according to claim 1, wherein in the number m×n of the multi-core blocks accommodated in the accommodating portion of the ferrule, n=1 and m≤5.

4. The optical connector according to claim 1, wherein in the number m×n of the multi-core blocks accommodated in the accommodating portion of the ferrule, n=2 and m≤5.

5. The optical connector according to claim 1, wherein the multi-core block rotates with a clearance within a range of a maximum of m·Δa/2 and n·Δb/2 in the accommodating portion of the ferrule.

6. The optical connector according to claim 1, wherein each of the multi-core optical fibers comprises a plurality of cores and a cladding surrounding the plurality of cores;
in the plurality of cores, each of a distance between a core center and a center of the cladding is equal to each other; and
each of the multi-core optical fibers has allowable rotation angle deviation determined based on the distance.

7. The optical connector according to claim 1, wherein each of the multi-core optical fibers comprises a plurality of cores and a cladding surrounding the plurality of cores;
in the plurality of cores, a distance between at least one core center and a center of the cladding is different from a distance between the other remaining core centers and the center of the cladding; and
each of the multi-core optical fibers has allowable rotation angle deviation which is determined based on a maximum distance.

* * * * *